United States Patent [19]

Dumbaugh, Jr et al.

[11] 3,962,515

[45] June 8, 1976

[54] STRENGTHENED COMPOSITE GLASS ARTICLE AND METHOD OF PRODUCTION

[75] Inventors: William H. Dumbaugh, Jr; Peter C. Schultz, both of Painted Post, N.Y.

[73] Assignee: Corning Glass Works, Corning, N.Y.

[22] Filed: Aug. 21, 1975

[21] Appl. No.: 606,581

Related U.S. Application Data

[63] Continuation-in-part of Ser. No. 492,441, July 29, 1974, abandoned.

[52] U.S. Cl. .................................. 428/392; 106/52; 428/428

[51] Int. Cl.² .................. B32B 17/06; B32B 17/12; C03C 3/04

[58] Field of Search ................ 106/52, 50; 428/392, 428/428; 65/41

[56] References Cited

UNITED STATES PATENTS

| | | | |
|---|---|---|---|
| 2,313,296 | 3/1943 | Lamesch............................ | 428/398 |
| 2,326,059 | 8/1943 | Nordberg............................. | 106/52 |
| 3,227,032 | 1/1966 | Upton................................... | 65/3 |
| 3,484,258 | 12/1969 | Redwine et al..................... | 106/39.6 |
| 3,597,305 | 8/1971 | Giffen................................. | 428/216 |
| 3,644,607 | 2/1972 | Roques et al....................... | 264/60 |
| 3,778,335 | 12/1973 | Boyd................................... | 106/52 |
| R27,560 | 1/1973 | Achener.............................. | 65/3 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

A composite glass article is disclosed that is composed of a $TiO_2$—$Al_2O_3$—$SiO_2$ glass core portion encompassed within a compressively stressed, vitreous silica-type glass exterior portion. The composite is strengthened by heat treatment within the ranges of 600°C. to 900°C. to effect a non-reversible contraction of the core glass at temperatures below the lowest glass strain point.

7 Claims, 3 Drawing Figures

STRENGTHENED COMPOSITE GLASS ARTICLE AND METHOD OF PRODUCTION

This application is a continuation-in-part of our co-pending application Ser. No. 492,441, filed July 29, 1974, now abandoned.

BACKGROUND OF THE INVENTION

This invention relates to a composite glass article composed of a core portion encompassed within a compressively stressed exterior portion. It is more particularly concerned with such a glass structure wherein the exterior portion is a vitreous silica-type glass.

The term "vitreous silica glass" is herein used to include any form of vitrified silica including fused quartz, fused silica, and materials such as 96% silica glass which are composed essentially of silica and have closely related physical and chemical characteristics. "Fused silica" refers to silica which is initially produced in particulate form, as by flame hydrolysis of silicon tetrachloride. Thereafter, the silica particles are formed into articles by any one of three methods: (1) collected directly in a heated chamber as a glass boule; (2) collected as a porous preform and consolidated to a non-porous glass; or (3) collected as a soot which is molded and consolidated.

A "vitreous silica-type glass" or a "fused silica-type glass" will generally possess the parent glass characteristics, but may contain additional constituents, or additives, in minor amounts to impart special radiation, transmission, or other physical characteristics.

The vitreous silicas are well known for certain physical properties which render them unique among glasses. Such properties include: excellent refractoriness which permits use at high temperatures; chemical inertness; and a low thermal coefficient of expansion (on the order of 5 to 10 × $10^{-7}$/°C. over the range 0°–300°C.) which provides high resistance to thermal shock. In spite of these exceptional attributes, use of the silica glasses has been limited by their relatively low mechanical strength and the difficulty in devising any practical means of increasing such strength.

Traditionally, glasses have been strengthened by thermal tempering; that is, sudden chilling of a glass surface from a temperature near the glass softening point, followed by slower cooling of the glass body. The degree of strengthening attainable by this procedure is dependent on the magnitude of the linear expansion coefficient of the glass. Therefore, it is not an effective procedure with silica glasses having low expansion coefficients on the order of 5–10 × $10^{-7}$/°C.

More recently, chemical strengthening techniques have been developed that are based on an ion exchange. These techniques are also ineffective on silica glasses since the latter contain no exchangeable ions.

It has also been long recognized that casing a high expansion glass with a lower expansion glass can yield high compressive forces and consequent high strength. The low thermal expansion coefficients of the silica glasses make them ideal candidates for skin or exterior glasses in a cased or composite structure. However, attempts to apply a silica glass over a higher expansion core glass have encountered difficulties. Whenever enough additives are introduced into a potential core glass to raise its expansion to an adequate level for high strength development, the core glass becomes too soft; that is, it has too low a viscosity at the fusing or combining temperature.

DESCRIPTION OF THE PRIOR ART

U.S. Pat. No. 2,326,059, granted Aug. 3, 1943 to M. E. Nordberg, describes the production of fused silica glasses by flame hydrolysis. It specifically discloses glasses containing 89% to 95% silica and 5% to 11% titania with the option of up to 5% of the silica or titania being replaced by aluminum or zirconium oxides. The glasses are described as having coefficients of expansion lower than silica and approaching zero.

The patent discloses the formation of articles of fused silica glass utilizing three methods. In the first, the particles coming from the flame are collected directly in a heated chamber and are thereby essentially simultaneously vitrified into a glass shape. In the second, the particles coming from the flame are collected as a porous preform of sintered particles which is thereafter fired at highly elevated temperatures to fuse or consolidate the porous preform into a solid glass body. In the third, the particles from the flame are simply collected as a mass of particulate material which is subsequently formed into a shape and fired at high temperatures to consolidate to a solid glass body.

The second mode of article formation, i.e., the consolidation of a porous preform, is discussed in some detail. Temperatures of 1500°–1600°C. are described as useful in fusing the preform into a solid body. During the consolidation step, the preform necessarily shrinks to fill in the pores.

U.S. Pat. No. 2,313,296, granted Mar. 9, 1943 to A. Lamesch, describes a composite glass fiber composed of a core glass and an outer glass layer of lower thermal coefficient of expansion whereby strengthening compressive stresses are developed.

U.S. Reissue Pat. No. 27,560, granted Jan. 23, 1973 to C. Achener, discloses such a fiber wherein the outer layer is a glass that does not devitrify and the core is a glass that devitrifies and shrinks in volume as it devitrifies to develop compressive stress in the outer glass layer. That patent refers to U.S. Pat. No. 2,920,971, the basic patent in the field of glass-ceramics, as illustrative of devitrifiable glasses and the products resulting therefrom which are operable as core members. U.S. Pat. No. 2,920,971 describes the production of highly crystalline bodies through the controlled crystallization in situ of glass bodies. This crystallization in situ is accomplished by heat treating the glass bodies at temperatures above the strain point of the glass and, commonly, above the softening point of the precursor glass. The patent defines glass-ceramic bodies as being predominantly crystalline, i.e., greater than 50% by weight crystalline, and specifically teaches the use of $TiO_2$ as a nucleating agent for the subsequent development of the crystallization. Achener describes his core glasses as being substantially crystalline and notes that he preferred compositions utilizing lithium as a devitrification catalyst in a similar manner to the use of $TiO_2$ in U.S. Pat. No. 2,920,971.

U.S. Pat. No. 3,484,258, granted Dec. 16, 1969 to R. H. Redwine et al., discloses glass-ceramic articles consisting essentially of $TiO_2$ and $SiO_2$, with $Al_2O_3$ an optional ingredient, and containing a semiconductive or conductive crystal phase represented by the structural formula $Ti_xO_{2x-1}$.

U.S. Pat. No. 3,227,032, granted to L. O. Upton on Jan. 4, 1966, discloses a strengthened fiber optic having a cladding of silica glass and a core of fused alumina (sapphire) with an expansion of 77 × $10^{-7}$ units.

U.S. Pat. No. 3,644,607, granted Feb. 22, 1972 to R. A. Roques et al., describes a vapor phase deposition (flame hydrolysis) technique for depositing a low expansion $TiO_2$—$SiO_2$ layer, containing less than 1% $TiO_2$, over a pure silica core to achieve strengthening by difference in thermal expansion coefficients. However, the degree of difference, and consequent degree of strengthening, is small in such a composite.

SUMMARY OF THE INVENTION

We have now discovered a family of glasses that exhibits a unique combination of properties which renders them peculiarly useful as core glasses in the production of strong silica glass composites. Initially, these glasses have strain points over 800°C., and generally on the order of 900°C., thereby being adequately refractory to permit combination with a silica glass. They also have low positive coefficients of thermal expansion (in the range of 5 to $20 \times 10^{-7}$/°C.) up to about 600°C., whereby they closely match the expansion characteristics of the vitreous silicas. However, we have found that, between 600°C. and 900°C., these glasses behave in a most unusual manner. Specifically, they contract in a non-reversible manner which causes a shrinkage equivalent to a negative coefficient of thermal expansion on the order of $-80$ to $-90 \times 10^{-7}$/°C. in this temperature range. This temperature range is particularly significant because, in large part at least, it is below the strain points of both the present glasses and fused silica. This enables retention of stresses developed in a composite by the contraction.

Our invention, based on these discoveries, is a composite glass article composed of a glass core portion encompassed within a compressively stressed exterior glass portion, the core portion consisting essentially of, in cation percent on an oxide basis, 65–92% $SiO_2$, 1–25% $AlO_{1.5}$, and 2–25% $TiO_2$, and the exterior portion being composed essentially of a vitreous silica type glass. In a preferred embodiment, the core glass consists essentially of 72–89% $SiO_2$, 2–15% $AlO_{1.5}$, and 4–21% $TiO_2$. The invention further contemplates a method of producing such a compressively stressed glass article which comprises forming a glass core of desired shape from a glass consisting essentially of, in cation percent on an oxide basis, 65–92% $SiO_2$, 2–25% $TiO_2$, and 1–25% $AlO_{1.5}$, applying to the surface of the glass core a silica glass layer to form a composite glass body, and thereafter subjecting the composite body to a thermal treatment, at a temperature below the glass strain point and within the temperature range of 600°C. to 900°C., to cause shrinkage of the core glass. In a preferred method, the silica glass layer is produced by passing a hydrolyzable silicon compound into a flame to form a silica soot by flame hydrolysis, depositing the soot over the surface of the $Al_2O_3$—$TiO_2$—$SiO_2$ glass body to form a porous silica layer thereon, and thermally consolidating the silica layer to a non-porous glass.

DESCRIPTION OF THE DRAWING

The invention is described with reference to the accompanying drawing wherein.

DESCRIPTION OF THE INVENTION

Figure 1:
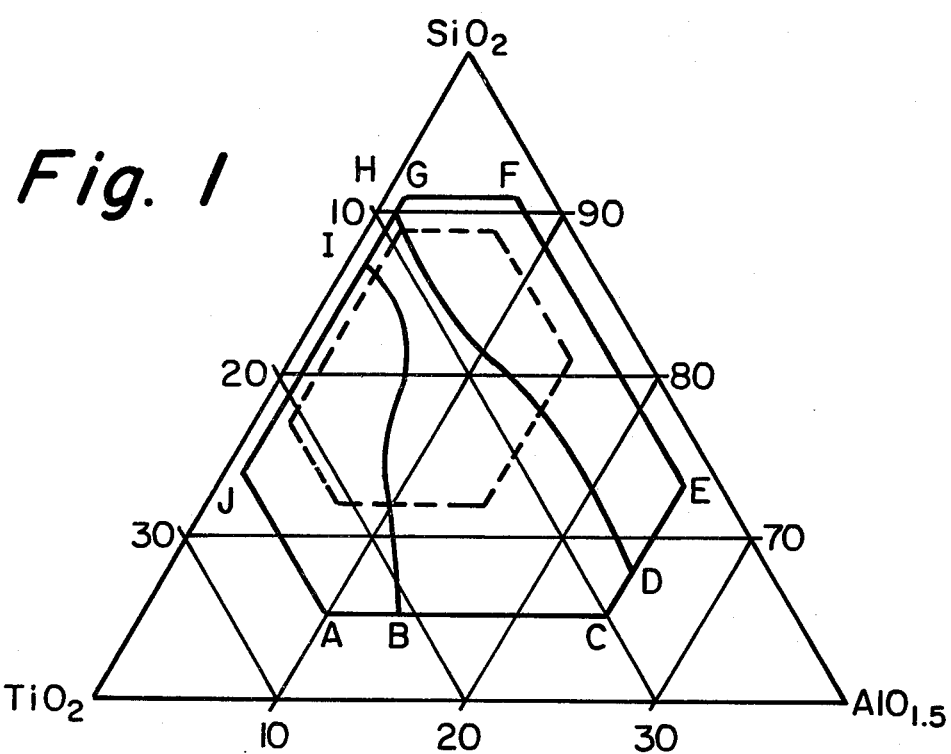
FIG. 1 is a ternary composition diagram graphically depicting the family of glasses that provide suitable core glasses for the composite glass articles of the invention.

FIG. 1 is the upper portion of a ternary diagram based on the three oxides $SiO_2$, $TiO_2$, and $AlO_{1.5}$ expressed in cation percent. Thus, the apex represents 100% $SiO_2$, whereas the left hand end of the base line represents 40% $TiO_2$ and the right hand end represents 40% $AlO_{1.5}$.

The area consisting of the points within geometric figure ABCDEFGHIJA represents a family of ternary glasses composed of the three indicated oxides. More specifically, it represents those glasses that undergo, to a substantial extent, the peculiar contraction or shrinkage behavior mentioned earlier, and possess other characteristics which make them suitable as core glasses for the present invention. This family of glasses may be approximately defined on a cation percent basis by the ranges 65–92% $SiO_2$, 2–25% $TiO_2$, and 1–25% $AlO_{1.5}$. This is roughly equivalent to 60–92% $SiO_2$, 3–30% $TiO_2$, and 1–22% $Al_2O_3$ on a weight percent basis.

In general, the three essential oxides are $SiO_2$, $TiO_2$, and $Al_2O_3$ within the indicated ranges. However, minor amounts, ranging up to five percent total, of recognized glass additives may be employed without loss of the characteristic shrinkage property. In particular, a small amount of alkali metal oxide (e.g., $Li_2O$ or $Na_2O$) or alkaline earth metal oxide may be present to reduce the strain point. This facilitates glass melting and forming, but decreases the ultimate service temperature as well as the temperature range over which effective strengthening occurs. Glass colorants and fining agents may also be present if desired.

The glasses illustrated by geometric figure ABCDEFGHIJA may be classed in three categories on the basis of opacity in the glass as melted and molded. Glasses in the area DEFGHD on the right hand side of the graph are clear, transparent glasses, while those in the area ABIJA on the lef hand side are dense opal glasses when cooled. The glasses in the central area BCDHIB tend to show a slight opacity and may be considered translucent.

Glasses in the clear (transparent) area are suitable for such uses as strong, thermally-resistant windows where unobstructed light transmission is of paramount importance. Glasses in the dense opal area would be adapted to use in composite cooking ware, containers, or heating plates where transparency is unimportant or not desired. Opacity is due to crystals suspended in the glassy matrix, such crystals consisting mainly of anatase and rutile (forms of $TiO_2$). The actual amount of crystallization is small, commonly much less than about 10% by weight. Glasses which provide an optimum degree of contraction, and consequent strengthening, as well as providing good characteristics for forming and heat treating composites, are found within a smaller area of the diagram that is enclosed within a dashed line. These glasses generally contain, on a cation percent basis, 72–89% $SiO_2$, 2–15% $AlO_{1.5}$, and 4–21% $TiO_2$. This is roughly equivalent to 70–89% $SiO_2$, 2–14% $Al_2O_3$, and 6–25% $TiO_2$ on a weight percent basis.

The glasses illustrated in FIG. 1 may be melted from a batch composed of oxides, or corresponding compounds, mixed in suitable proportions. The glasses melt at temperatures on the order of 1800°C., so that highly refractory containers such as platinumrhodium crucibles are required. In the interest of good optical quality glass, the batch may be melted, cooled, crushed, and remelted. It may also be formed by the flame hydrolysis technique, particularly where high optical quality is desired.

Glasses within area ABCDEFGHIJA of FIG. 1 exhibit quite normal, or conventional, expansion behavior as they are heated from room temperature to about 600°C. Within this temperature range the glasses undergo a small positive linear expansion; that is, have an expansion coefficient of 5 to 20 × $10^{-7}$/°C. Thus, their behavior is quite similar to the vitreous silicas which have a coefficient of approximately 8 × $10^{-7}$/°C. over the same temperature range.

Above 600°C. the $TiO_2$—$Al_2O_3$—$SiO_2$ glasses undergo a dramatic change in expansion behavior. The effective result of this sudden reversal in expansion behavior is a contraction or shrinkage that is equivalent to a large negative coefficient of expansion, on the order of −80 to −90 × $10^{-7}$/°C. in the temperature range of 600°-900°C. For the most part, this contraction occurs below the glass strain points which are generally close to 900°C. Also, it occurs below the strain points of vitreous silicas which vary from 880°C. to 1090°C. depending on water content, thermal treatments, and other variables.

In accordance with the invention, a glass composite is prepared in which the core portion is composed of one of the $TiO_2$—$Al_2O_3$—$SiO_2$ glasses illustrated within area ABCDEFGHIJA in FIG. 1. This core is clad with a vitreous silica layer by any convenient method as, for example, by collapsing a hollow shape such as tubing thereabout, by sputtering, by chemical vapor deposition, or by applying a silica slip or gel and sintering. Preferably, we apply a silica layer or coating by flame hydrolysis and then consolidate the deposit to a fused silica glass layer. A simple silica layer is normally preferred for cladding. However, where special properties are needed, minor additives, e.g., $CeO_2$, may be included in small amounts that do not substantially modify the primary characteristics of the silica glass.

The composite of $TiO_2$—$Al_2O_3$—$SiO_2$ and vitreous silica type glasses thus formed is now subjected to heat treatment in the 600°-900°C. temperature range. This causes the large non-reversible contraction to occur in the core glass, thereby putting the fused silica layer or skin into compression. The degree of compressive stress thus developed correlates to the magnitude or extent of contraction that occurs.

We do not fully understand the thermal contraction or shrinkage phenomenon that characterizes the $SiO_2$—$TiO_2$—$Al_2O_3$ glasses of our invention. However, it has been observed that it does result in a density change and that, unlike normal dimensional changes, it is not reversible on cooling. Therefore, we assume that a structural change of some sort occurs in the glass, but the exact nature thereof remains to be fully explained.

DESCRIPTION OF SPECIFIC EMBODIMENTS

The invention is further described with reference to specific examples wherein the core portions are composed of glasses having compositions as shown below in Table 1A (cation percent) and Table 1B (weight percent) on an oxide basis. Also shown in Table ZA are relevant glass properties including annealing point (A. P.) and strain point (St. P.) in degrees Centigrade (°C.), the unit contraction ΔL/L in ppm. for a single thermal heat treatment to a temperature of 750°C. (both heating and cooling being at a rate of 100°C. per hour), and the visual appearance of the glass. X-ray diffraction analyses for the glasses identified rutile and anatase (forms of $TiO_2$) present in low concentration levels in the translucent and opal glasses. The total cyrstallinity, in weight percent, is reported. No crystallinity was found in the clear samples.

Table 1A

|  | (Cation Percent) | | | | |
|---|---|---|---|---|---|
|  | 1 | 2 | 3 | 4 | 5 |
| $SiO_2$ | 86.9 | 83.1 | 85.0 | 80.0 | 90.0 |
| $TiO_2$ | 7.3 | 7.3 | 12.5 | 10.0 | 2.5 |
| $AlO_{1.5}$ | 5.8 | 5.8 | 2.5 | 10.0 | 7.5 |
| $Li_2O$ | — | 3.8 | — | — | — |
| A.P., °C. | 1026 | 906 | 969 | 974 | 906 |
| St.P., °C. | 937 | 820 | 882 | 890 | 818 |
| ΔL/L ppm. |  | 1200 | 720 | 372 | 169 |
| Visual Appearance | clear amber blue | clear amber blue | opaque dense blue | translucent deep blue | clear light blue |
| % Crystals | — | — | 3.9 | 1.7 | — |

Table 1B

|  | (Weight Percent) | | | | |
|---|---|---|---|---|---|
|  | 1 | 2 | 3 | 4 | 5 |
| $SiO_2$ | 85.6 | 84.2 | 81.9 | 78.6 | 90.3 |
| $TiO_2$ | 9.6 | 9.8 | 16.0 | 13.1 | 3.3 |
| $Al_2O_3$ | 4.8 | 5.0 | 2.1 | 8.3 | 6.4 |
| $Li_2O$ | — | 1.0 | — | — | — |

Figure 2:
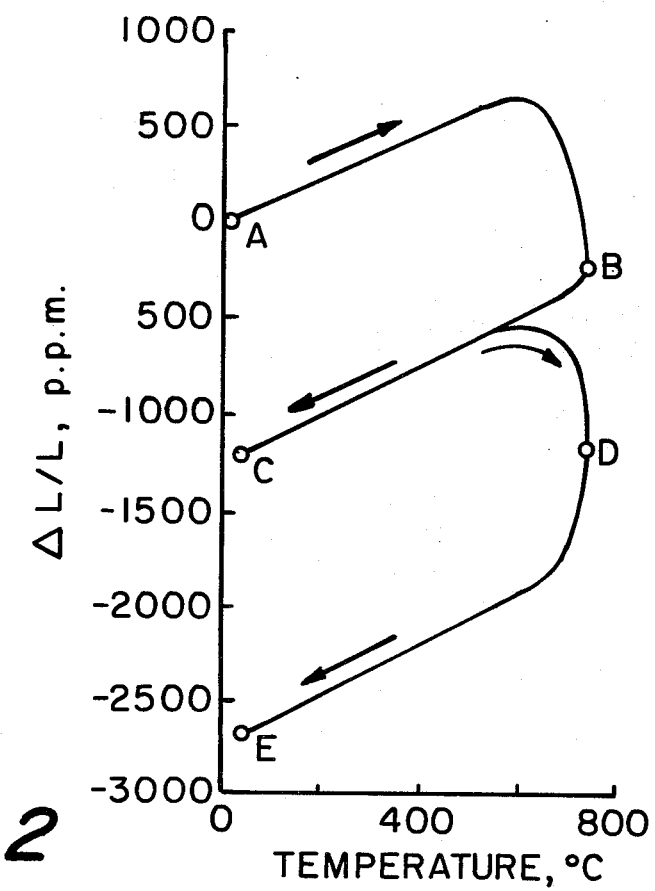
FIG. 2 is a graphical illustration of the unique expansion behavior of the glasses illustrated in FIG. 1.

The characteristic thermal expansion behavior of these glasses is further illustrated in FIG. 2 wherein temperature, in °C., is plotted along the horizontal axis and relative length change in a glass sample, ΔL/L in parts per million (ppm), is plotted along the vertical axis.

Initially, a glass corresponding to composition 2 in Table 1 was melted at 1850°C. for sixteen (16) hours and cooled without annealing to room temperature. Expansion bars were cut from the glass, reheated to approximately 750°C. and then cooled, the complete cycle being at a rate of 100°C./hour. Changes in length during this subsequent thermal treatment were recorded and are shown in FIG. 2.

As the glass was reheated from room temperature, it began to expand, from an arbitrary zero point A, at the rate of about 1.1 ppm/°C. until glass temperature reached 600°C. This represented an average linear coefficient of thermal expansion between 25°C. and 600°C. of 11 × $10^{-7}$/°C. As the glass was heated above 600°C., it began to rapidly contract toward point B. The glass was then cooled from this point, but did not retrace its original expansion curve. Rather, it followed a path that paralleled the original expansion curve back to point C. The result was a non-reversible sample shrinkage of ~1200 ppm. When the glass was given a second, essentially identical heat treatment, the original curve was essentially duplicated, but starting at point C, that is offset by 1200 ppm. When the glass was heated beyond 600°C. this second time, it again rapidly contracted, now toward point D. Cooling from this point resulted in a second non-reversible shrinkage to point E. The result of these two heating/cooling cycles was a total shrinkage of 2700 ppm. This thermal treatment was repeated a few more times, after which the total shrinkage observed was 8200 ppm (i.e., almost 1%) and the density had increased from an initial value of 2.258 to 2.314 gm/cc.

When this glass was clad with fused silica, the core shrinkage illustrated in FIG. 2 could not be relieved by the cladding glass at temperatures below 900°C. Hence, the core was put into tension and the cladding into compression by this compaction phenomenon. This was observed experimentally, the magnitude of the compressive stress being found to depend upon composition of the core glass, heat treatment time, and temperature.

A 2000 gram batch of each of compositions 2 and 4 of Table 1 was prepared from reagent grade oxides (except for $Li_2O$ added as lithium carbonate) and the batches homogenized by ball milling for 24 hours. Each batch was melted in a platinum-rhodium crucible for 48 hours at 1800°C. in air. Each melt was cooled, crushed to minus 200 mesh (74 microns), and then remelted at 1800°C. Six mm. OD canes were drawn from each melt and cooled. The canes were of excellent quality with few striated bubbles and no apparent solid inclusions. The canes were then cut into 4 inch long rods and each rod coated with a layer of fused silica by a conventional flame hydrolysis technique.

In this process, each cane was mounted in a chuck that rotated the cane at 140 rpm. while translating it through the flame of a combustion burner at a rate of 24 inches/minute. The burner was an oxygas burner positioned 6.5 inches from the rotating glass rod with a fuel mix of 0.3 standard cubic feet/minute (scfm) gas and 0.8 scfm oxygen and with an additive stream produced by bubbling oxygen at a rate of 920 cc./minute through a silicon tetrachloride ($SiCl_4$) reservoir at a temperature of 20°C.

After 10 minutes, an even layer of fused silica soot had been deposited on the rod to a thickness of 0.5–1.0 mm. This layer was then sintered to a clear glass, about 75 microns thick, by heat treating the composite at a temperature on the order of 1500°–1600°C. using a gas/oxygen ring burner through which the composite rod was passed at the rate of 0.25 inch/minute. The resultant composite rod consisted of a 6 mm OD core glass 4 inches long with a clear, high-quality cladding of pure vitreous silica, about 75 microns thick. An excellent core/cladding interface was obtained.

The silica clad rods were then cut into 2 mm lengths and polished on one end. The initial circumferential compressive stress at the outer surface of the cladding layer was then measured by optical methods using a polarizing microscope. The samples were then heat treated at various temperatures for times up to 22 hours and the circumferential compressive stresses measured again by optical methods. The results are shown in FIG. 3, wherein heat treatment time in hours is plotted along the horizontal axis and compressive stress in the silica cladding layer, as measured in thousands of psi, is plotted along the vertical axis.

It will be noted that a maximum compressive stress strengthening effect of about 36,000 psi can be obtained with the core glass of Example 1 by heat treatment of the composite for 6–8 hours at 750°C. This compares favorably with the strengths attainable in commercial glasses by chemical strengthening (ion exchange), and is more than double the effect that can be achieved in such commercial glasses through conventional thermal tempering. Furthermore, as noted earlier, neither of these traditional processes can be effectively applied to fused silica-type glasses.

Figure 3:
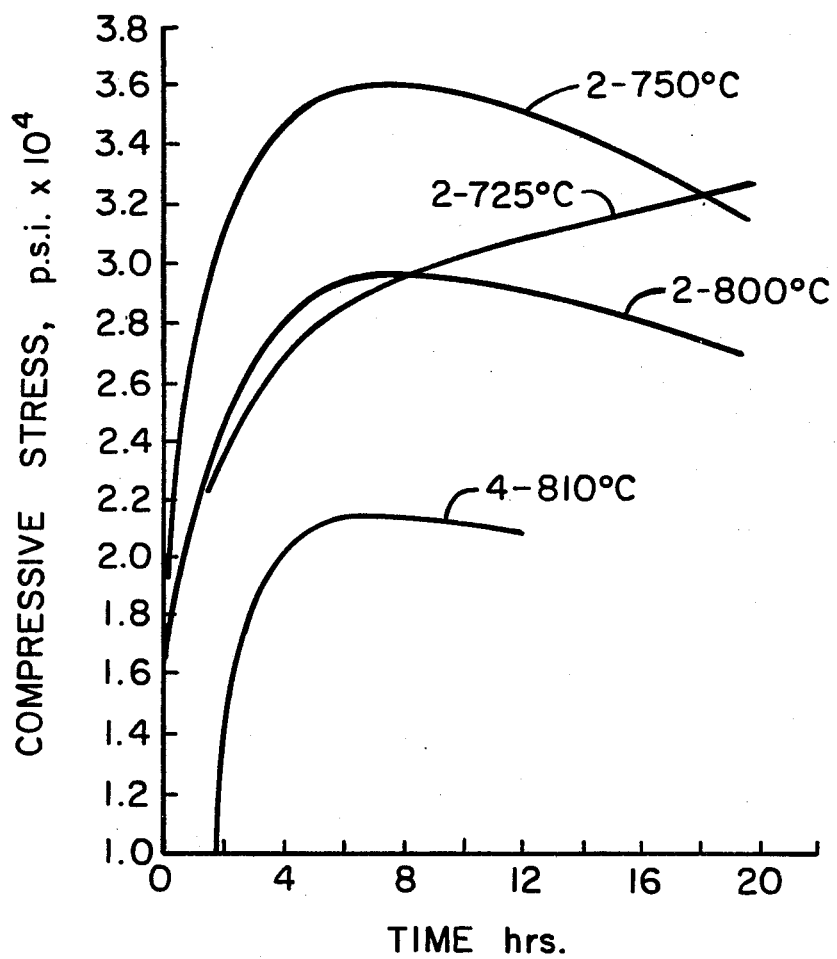
FIG. 3 is a graphical illustration of the potential compressive stresses that can be developed in exemplary composites of the invention.

A further experiment was carried out to determine the effect of a minor composition additive on the potential for compressive stress development and consequent strengthening of a composite, and, at the same time, to further check the effects of time and temperature as illustrated in FIG. 3. In experiment, compositions 1 and 2 of Table 1 above were selected for comparison since the single difference is a substitution of 3.8 cation percent $Li_2O$ for $SiO_2$. Glasses having these compositions were melted and cane on the order of 0.15 to 0.20 in diameter drawn therefrom. The canes, as drawn, were coated with silica soot and heat treated as described earlier to consolidate the soot and form a non-porous, fused silica skin on the cane. Thus, a plurality of composite rods were formed in essentially identically identical manner from each melt of each glass.

One set of each type was subjected to heat treatment at 750°C., while a second set of each type was subjected to a heat treatment at 850°C. During each heat treatment, cane of each type were withdrawn periodically for measurement of the compressive stress developed in the cladding or skin layer on each rod, the measurements being made by optical means as described above.

The data thus obtained indicated that the presence of $Li_2O$ in the core glass had essentially no effect on strengthening potential. Likewise, minor amounts of other additive oxides may be used with substantially no effect, but care must be taken to avoid undue lowering of the strain point. It was also apparent, as indicated in FIG. 3, that a maximum strengthening effect occurs followed by a loss with longer heat treatment. In general, the 750°C. treatment was more effective but a longer time was required to achieve maximum strengthening. Thus, on the order of eight (8) hours were required at 750°C., whereas at 850°C. maximum strength was attained in four (4) hours.

By way of further illustrating the invention, and more particularly indicating the significance of the composition limits, the following examples are set forth on an oxide basis in cation percent (Table 3A) and in percent by weight (Table 3B) and the absolute values in ppm for ΔL/L given for each example.

Table 3A

| | (Cation Percent) | | | |
|---|---|---|---|---|
| | $SiO_2$ | $TiO_2$ | $AlO_{1.5}$ | ΔL/L (ppm) |
| 1. | 90 | 7.5 | 2.5 | 81 |
| 2. | 90 | 2.5 | 7.5 | 169 |
| 3. | 93 | 1.5 | 5.5 | 27 |
| 4. | 85 | 2.5 | 12.5 | 30 |
| 5. | 70 | 15 | 15 | 270 |
| 6. | 75 | 20 | 5 | 460 |
| 7. | 70 | 20 | 10 | 185 |

Table 3A-continued

| | SiO$_2$ | (Cation Percent) TiO$_2$ | AlO$_{1.5}$ | ΔL/L (ppm) |
|---|---|---|---|---|
| 8. | 75 | 5 | 20 | 160 |

Table 3B

| | SiO$_2$ | (Weight Percent) TiO$_2$ | Al$_2$O$_3$ |
|---|---|---|---|
| 1. | 88.1 | 9.8 | 2.1 |
| 2. | 90.3 | 3.3 | 6.4 |
| 3. | 93.4 | 2.0 | 4.6 |
| 4. | 85.9 | 3.4 | 10.7 |
| 5. | 68.2 | 19.4 | 12.4 |
| 6. | 70.9 | 25.1 | 4.0 |
| 7. | 66.6 | 25.3 | 8.1 |
| 8. | 76.1 | 6.7 | 17.2 |

In general, a shrinkage less than about 50 ppm. is considered to be of no consequence, with the preferred values exceeding about 300 ppm. While all of the examples in Tables 3A and 3B, except example 3, are within the scope of the present invention, most are near or at the limits illustrated by the composition ranges and by the area ABCDEFGHIJA in FIG. 1. Thus, they illustrate marginal embodiments of the invention. It may be noted that, while the degree of contraction is satisfactory for the glasses of Examples 5 and 6, these glasses crystallized so badly during working that a suitable composite could not be produced by normal redraw and coating methods. Special forming techniques can be used, but this obviously renders these glasses of limited application.

In summary, the present invention provides composite glass articles having the following characteristics:

1. A refractory, chemically-durable surface that is characteristic of fused silica bodies.
2. Potentially high mechanical strength which does not degrade or release below the glass strain points which are generally above 800°C. and may be on the order of 900°C.
3. Low positive expansion coefficient between 25°C. and 600°C. comparable to fused silica, whereby high thermal shock resistance can be attained together with mechanical strength.
4. A refractory body that can withstand temperatures up to about 900°C. without distortion.
5. Optional opacity in the core glass.

We claim:

1. A composite glass article composed of a glass core portion encompassed within a compressively stressed exterior glass portion, the glass core portion consisting essentially of, in cation percent on an oxide basis, 65–92% SiO$_2$, 1–25% AlO$_{1.5}$, and 2–25% TiO$_2$, and the exterior glass portion being composed essentially of a vitreous silica type glass selected from the group consisting of fused quartz, fused silica, and 96% silica glass.

2. A composite glass article in accordance with claim 1 wherein the core portion is an optically clear glass having a composition within area DEFGHD of FIG. 1.

3. A composite glass article in accordance with claim 1 wherein the core portion is an opal glass having a composition within area ABIJA of FIG. 1 and containing anatase and/or rutile crystals.

4. A composite glass article in accordance with claim 1 wherein the core portion is a glass consisting entirely of SiO$_2$, TiO$_2$, and Al$_2$O$_3$.

5. A composite glass article in accordance with claim 1 wherein the core portion is a glass consisting essentially of, in cation percent on an oxide basis, 72–89% SiO$_2$, 2–15% AlO$_{1.5}$, and 4–21% TiO$_2$.

6. A composite glass article in accordance with claim 1 wherein the core portion glass contains up to 5 cation percent total of one or more additional oxides.

7. A composite glass article in accordance with claim 1 wherein the core portion glass consists of 86.9% SiO$_2$, 7.3% TiO$_2$, and 5.8% AlO$_{1.5}$ on a cation basis.

* * * * *